United States Patent
Hiremath et al.

(10) Patent No.: US 11,068,924 B2
(45) Date of Patent: Jul. 20, 2021

(54) ACTION INDUCEMENT PROCESSING

(71) Applicant: NCR Corporation, Duluth, GA (US)

(72) Inventors: Nagaprakash Sekharaiah Hiremath, Bangalore (IN); Murali Mohan Atmakuri, Bangalore (IN); Suzan Szollar, Menlo Park, CA (US)

(73) Assignee: NCR Corporation, Atlanta, GA (US)

( * ) Notice: Subject to any disclaimer, the term of this patent is extended or adjusted under 35 U.S.C. 154(b) by 337 days.

(21) Appl. No.: 15/446,594

(22) Filed: Mar. 1, 2017

(65) Prior Publication Data
US 2018/0253748 A1    Sep. 6, 2018

(51) Int. Cl.
*G06Q 30/00*        (2012.01)
*G06Q 30/02*        (2012.01)

(52) U.S. Cl.
CPC ..... *G06Q 30/0226* (2013.01); *G06Q 30/0209* (2013.01); *G06Q 30/0224* (2013.01)

(58) Field of Classification Search
CPC .......... G06Q 30/0226; G06Q 30/0261; G06Q 30/0209; G06Q 30/0224
USPC ...................................... 705/14.12
See application file for complete search history.

(56) References Cited

U.S. PATENT DOCUMENTS

| | | | | |
|---|---|---|---|---|
| 9,367,860 B2* | 6/2016 | McKirdy | ............. | A61B 5/0205 |
| 9,727,884 B2* | 8/2017 | Weiss | ................. | G06Q 30/0211 |
| 9,870,716 B1* | 1/2018 | Rao | ......................... | G09B 5/065 |
| 10,097,947 B2* | 10/2018 | von Cavallar | .......... | G06F 16/29 |
| 2012/0303425 A1* | 11/2012 | Katzin | ................. | G06Q 20/027 |
| | | | | 705/14.4 |
| 2013/0249948 A1* | 9/2013 | Reitan | ..................... | G06F 3/011 |
| | | | | 345/633 |

OTHER PUBLICATIONS

Kim, Ethics and Information Technology, 2016.*

* cited by examiner

*Primary Examiner* — Azam A Ansari
*Assistant Examiner* — Michael I Ezewoko
(74) *Attorney, Agent, or Firm* — Schwegman, Lundberg & Woessner

(57) ABSTRACT

Tracking real-word and virtual actions taken by a user. A personalized set of actions are derived from the tracked actions (of the user or multiple other users similar to the user) for inducing the user to take loyalty program-based actions for a loyalty system within the personalized set of actions. An account associated with the user is credited with a reward based on the user performing one or a preconfigured number of the loyalty-based actions within the personalized set of actions.

4 Claims, 11 Drawing Sheets

FIG. 1(D)　　　　　　　　　　FIG. 1(E)

ACTION INDUCEMENT PROCESSING

BACKGROUND

Consumers are inundated with a myriad of loyalty-based programs and services offered by retailers. Nearly every retailer has their own loyalty program, even the smallest of retailers that are primary just located in one store or one confined geographical location. Unfortunately, because of the choices and the different electronic interfaces, few consumers actually participate in any substantial manner and many consumers fail to participate at all beyond initial signups (which are usually induced by a clerk at a retailer during a signup promotion).

The consumers also have a variety of different mobile applications to their various services on their mobile device. However, most consumers are likely to reduce a number of these services down to a smaller subset because the sheer volume of applications confuses the consumer when the consumer wants a specifically frequently used service.

This presents challenges and lost business opportunities for retailers that seek to be ever-present on consumer devices and that attempt to be fully integrated into the every-day activities of their consumers.

However, one strange phenomenon does exist in the industry, which is consumers are addicted to mobile-based games. In fact, consumers often spend money for playing these games when there is nothing of any value returned to the consumer beyond the satisfaction of winning the game (and the game levels) or obtaining virtual artifacts provided as the consumer progresses through game levels. Consumers spend more time everyday playing these games that have no tangible real-world reward than accessing mobile applications for retailers where real-world services to the consumer are provided.

SUMMARY

In various embodiments, methods and systems for action inducement processing of consumers are presented.

According to an embodiment, a method for action inducement processing. Specifically, in an embodiment, an activity that a user engages in; is identified and a campaign is created to encourage the user to perform at least one campaign activity similar to the activity or during the activity. Finally, the user is rewarded when the user performs the at least one campaign activity tracked with the campaign.

DETAILED DESCRIPTION

Figure 1A:
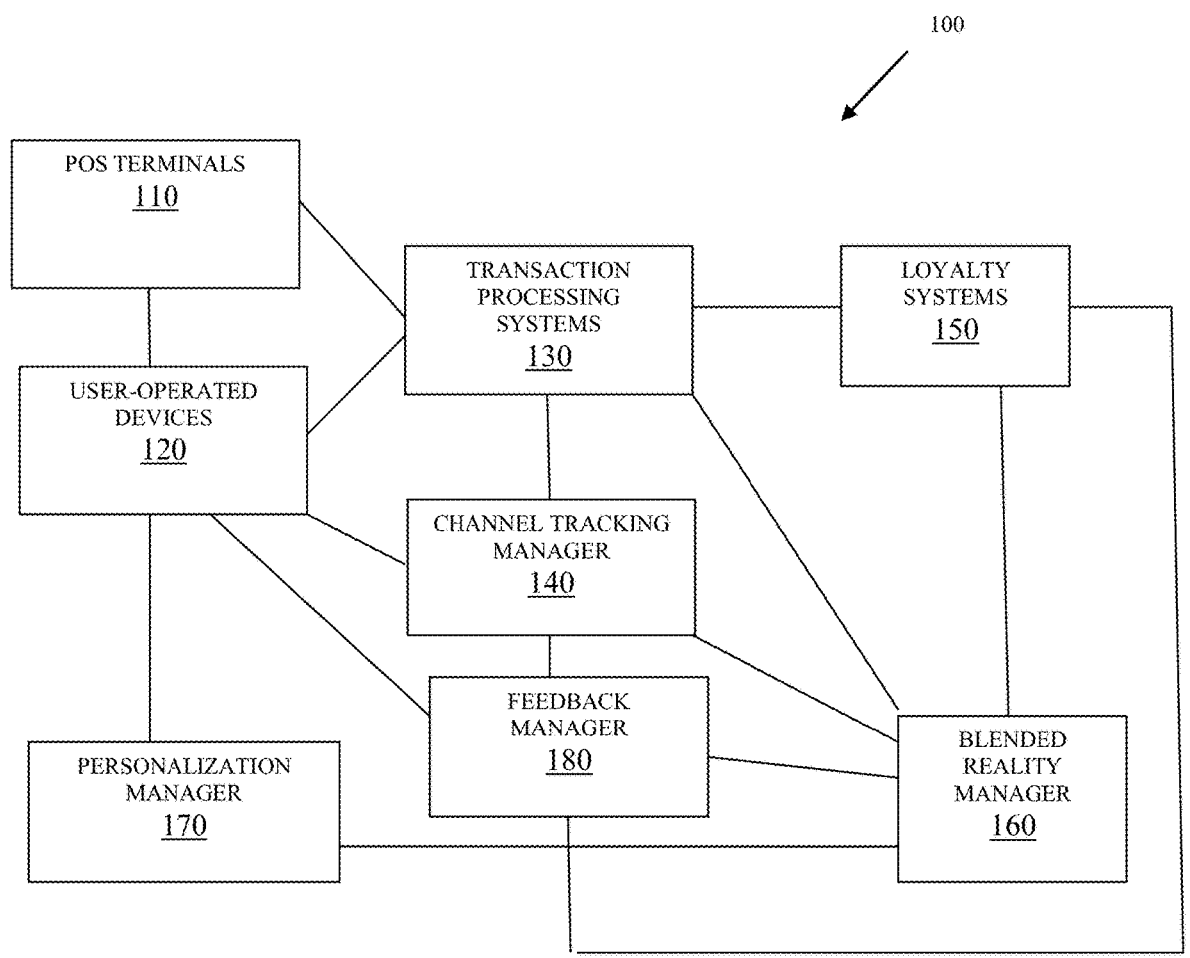
FIG. 1(A) is a diagram of a system action inducement processing, according to an example embodiment.

FIG. 1A is a diagram of a system action inducement processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the user-action inducement processing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for user-action inducement processing can be implemented in all, or some combination of the components shown in different hardware computing devices having one or more hardware processors.

As used herein, a "retailer" is a business that engages in transactions with a consumer. A retailer can include: financial institutions, non-profit organizations, conventional businesses (small or large), and government based agencies. A "user" can be a consumer or a retailer in any given transaction. That is, one retailer may be a consumer to a different retailer in a given transaction.

The system 100 includes: 1) one or more Point-Of-Sale (POS) terminals 110, a user-operated device 120, one or more transaction processing systems 130, a channel tracking manager 140, one or more loyalty systems 150, a blended reality manager 160, a personalization manager 170, and a feedback manager 180.

The system 100 when processed provides a personalized user-based game or application that integrates promotions and rewards of loyalty programs with real-world and virtual based activities of the user for purposes of inducing the user to perform loyalty-based actions in reaching goals for the game or application. When goals are reached, real-word rewards and provided to and redeemable by the user.

Each component 110-170 includes a variety of interfaces for the interaction depicted in the system. The components 110-170 are illustrated by a variety of processing scenarios to described various novel processing features of the system 100.

Initially, a user-operated device 120 obtains and installs a new or modified mobile application that permits the interaction between the user-operated device 120, the personalization manager 170, and the feedback manager 180. In and embodiment, the mobile application is an existing network-based service mobile application that the user already has installed on the user-operated device 120, which is enhanced for the interaction and processing discussed herein and below as a modified version of that existing mobile application. In an embodiment, the mobile application is a mobile banking application.

The interaction between the mobile application with the personalization manager 170 and the feedback manager 180 provides processing that adapts to real-world activities (consummating transactions, redeeming promotions, watching a video, physically visiting a specific geographic location) and virtual activities (performing operations within the mobile application, social media applications, and/or gaming applications) for creating a loyalty campaign that is personalized for the user based on the real-world and virtual activities. The campaign is a set of actions that are related and relevant to the users known activities. The actions can be performed through real-world or virtual activities by the user. In some cases, the set of actions are designed to change a user's behaviors with respect to the user's existing and known activities (inducing the user to gradually change their behavior) toward an enterprise desired activity that can also be a user desired activity.

As an example, consider a user that deposits a physical check at an Automated Teller Machine (ATM) every other Friday. The channel tracking manager 140 detects the check deposit occurring in a pattern at the ATM every other Friday. This is obtained through the transaction processing system 130 of the bank. The user operates an ATM, which is the POS terminal 110 (specifically, the ATM is a Self-Service Terminal (SST) which is a type of POS terminal). The channel tracking manager 140 reports the transaction details to the blended reality manager 160. The blended reality manager 160 interacts with the loyalty system 150 of the bank. The pattern is detected. The bank is trying to get its customers to use the remote deposit check (RDC) operation of the bank's mobile application (operating on the user's mobile phone 120). The loyalty system 150 includes a variety of cross-customer metrics, such as: 1) how many times a customer has to be reminded to use RDC instead of physical check deposits, and 2) how many times a customer has to successfully use RDC before the customers stop performing physical check deposits with an ATM (for the example assuming 4 times of using RDC converts a customer from physical check deposits to RDC transactions). The blended reality manager 160 processes these existing metrics to integrate reminders about the RDC into the user's mobile application with timing of the reminders that coincide with the existing known times that the user does the physical check deposits (every other Friday in the example scenario before noon). The loyalty campaign also provides a reward for converting to RDC for those customers that frequently make physical check deposits and do not use RDC. The blended reality manager provides the user's identifier (and/or device identifier), the inducement (promotion), and timing (every other Friday before noon) to the personalization manager 170. Every other Friday before noon, the personalization manager 170 sends the promotion reminder to the mobile application of the user's phone 120. As the user processes the RDC through the mobile application, the mobile application notifies the feedback manager 180 (of the channel tracking manager 140 notifies the feedback manager 180) of the RDC activity. The feedback manager notifies the blended reality manager 160. The feedback manager 160 may or may not notify the loyalty system 150. When 4 successful RDC operations are performed by the user, the blended reality manager 160 notifies the personalization manager 170 to stop sending the notification and promotion to the user.

The above-noted interaction example can apply to other known real-world activities of the user to induce the user to perform a less expensive virtual based activity (such as the RDC operation). For example, suppose the user is mailing physical checks for bills each month and the bank desires to move the users to online bill pay. The promotion and timing of that promotion can be integrated into when the user is likely to mail a physical check for bill pay for a preconfigured number of iterations until the user has changed their behavior to online bill pay (virtual or computer-based activity) instead of physical check bill pay (real-world activity).

The combination of interaction between the components 140-180) can also detected based on the user's behavior, the particular type of experience that the user is most likely to engage with and respond to while operating the mobile application, such that the more likely experience is provided within the interface of the mobile application. Furthermore, when the feedback manager 180 flags that the provided experience within the mobile application is unsuccessful, the experience can be dynamically modified or changed.

For example, suppose the user is tracked through the transaction processing system, the channel tracking manager 140, the mobile application on the user-operated device 120 as engaging regularly in participating in gaming applications (such as through purchases for game play or artifacts). In such a situation, a variety of gaming type actions can be enhanced into the mobile application that are similar to those games that the user engages in (this can be viewed as computer-based or virtual based user activities). The goal of a particular game (set of actions) enhanced in the mobile application may be to perform a series of campaign actions (real world and/or computer-based (virtual)). If the user is detected as being too slow to reach the goal, then requirements in the game for reaching the goal can be changed or accelerated so that the user does not lose interest and stays more engaged. Additionally, smaller sub-goals can be enticed by adding smaller promotions for the desired activities.

Consider another example, suppose that user's bill pay history reveals that every Saturday morning, the user physically visits a dry cleaner at a specific location within a town and then visits a pharmacy at the other side of town for a weekly prescription. (Again, these activities can be tracked through the transaction processing systems 130, the channel tracking manager 140, and/or the user's mobile application (that includes location services for identifying the location of the device 120).) The mobile application is a mobile banking application for a bank. The bank used bank branch used by the user is two doors down from the bank branch and the pharmacy is near the bank branch. The personalization manager 170 sends a notice to the mobile application one Saturday morning known to be at a time before the user begins in route to the dry cleaners, and provides a promotion for $5 off at the dry cleaners near the bank branch and the pharmacy (based on the campaign and metrics provided to the personalization manager 170 from the blended reality manager 160). The personalization manager 170 may also trigger the mobile application to show 5 Yelp® reviews for the dry cleaners having the $5 off promotion. Assuming the user goes to the dry cleaners (reported through the feedback manager 180), the blended reality manager 160 instructs the personalization manager to push a notification while at the dry cleaners for $1.50 cash back offer with my loyalty program at the pharmacy (though interaction between the blended reality manager 160 and the loyalty system 150 of the pharmacy). The personalization manager 170 may also provide a notification that if the user pays with the bank's debit card while at the pharmacy, the user will receive 2% cash back for the amount of the transaction with the bank. The mobile application could initiate an interactive game similar to Pokémon Go® (Bounty Hop) that interactively displays locations and movements of the user and the various rewards on a map animated with one or more characters and the rewards positioned on the map; the Bounty Hop game can also provide navigation instructions to the user from location to location. As the desired stops are made, the user collects game points or artifacts are collected by the user for the game play. The use of the debit card (or artifacts collected) may also check off activities that the user needs for obtaining a real-word reward monthly reward from the bank's loyalty system 150, such as $25 cash back. As the user approaches the bank branch, the blended reality manager 160 can instruct the personalization manager 170 to provide instructions to the mobile application that if the user performs a transaction at the bank branch's ATM 110 and gets a receipt for the ATM transaction, the receipt will include a coupon for a free bank-branded windshield sunshade that can be redeemed with a bank branch visit (providing another real-world reward). The bank also develops more loyalty with the user and a richer understanding the user and the user's need as well as free advertising. During the visit, the bank can have a conversation with the user about services available to the user that are not being used.

This illustrates how the system 100 integrates into the real-word and virtual world (online experiences) of a user in a personalized and customized manner that enriches the user by providing small promotions that integrated into game play with the real world activities and lead to bigger rewards for the user. Research indicates that user are far more likely to impulse spend than to save for the long haul. For example, statistics on game play with Candy Crush® suggests people spend an enormous amount of money monthly to play the game with no real-world reward (only artifacts and satisfaction on completing game levels) and their money is gone once used for game play. The system 100 permits real savings to add up on impulse buys (or planned buys) by the user for real-world goods and services that are induced through smaller promotions, with such activity generating additional rewards through game play, which can be spent at a later date. Essentially, inducing the user to save toward goals of a game while engaging in activities that the user would normally engage or can be induced to engage in based on existing user activities. The user is satisfied and engaged and the enterprise (bank in the examples) benefits through a closer relationship with the user and achieving bank desired behavior changes in the user, which in the long run substantially impacts the bank's revenues.

Figure 1B:
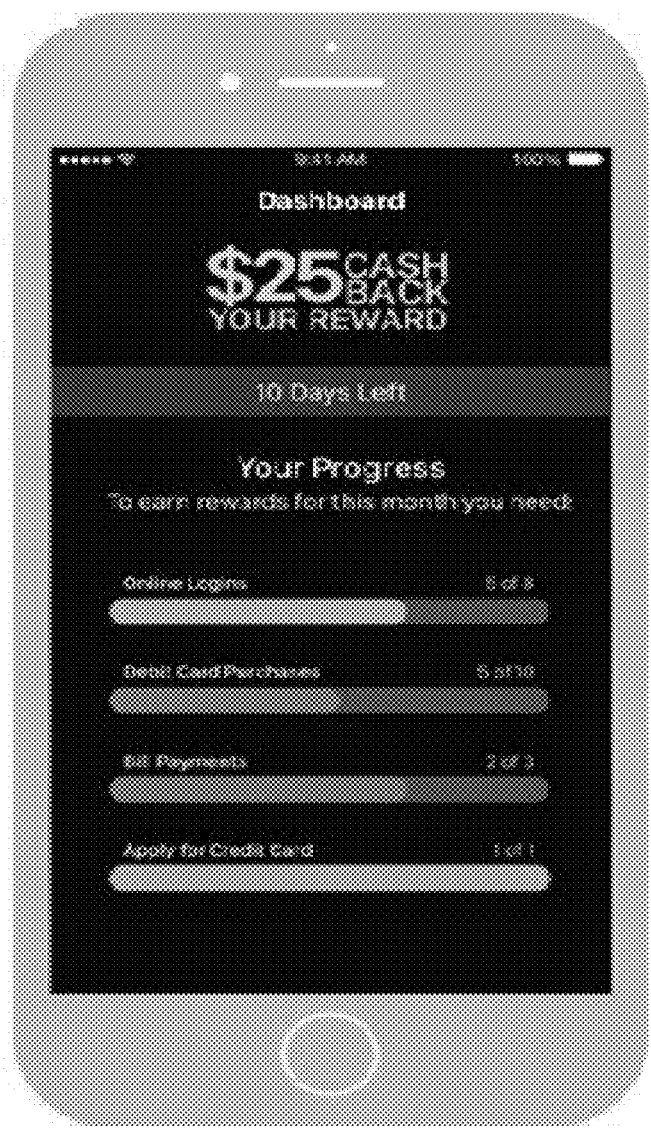
FIGS. 1(B)-(O) are screenshots rendered on a display of a user-operated device for action inducement processing by the system of the FIG. 1A, according to an example embodiment.
Figure 1C:
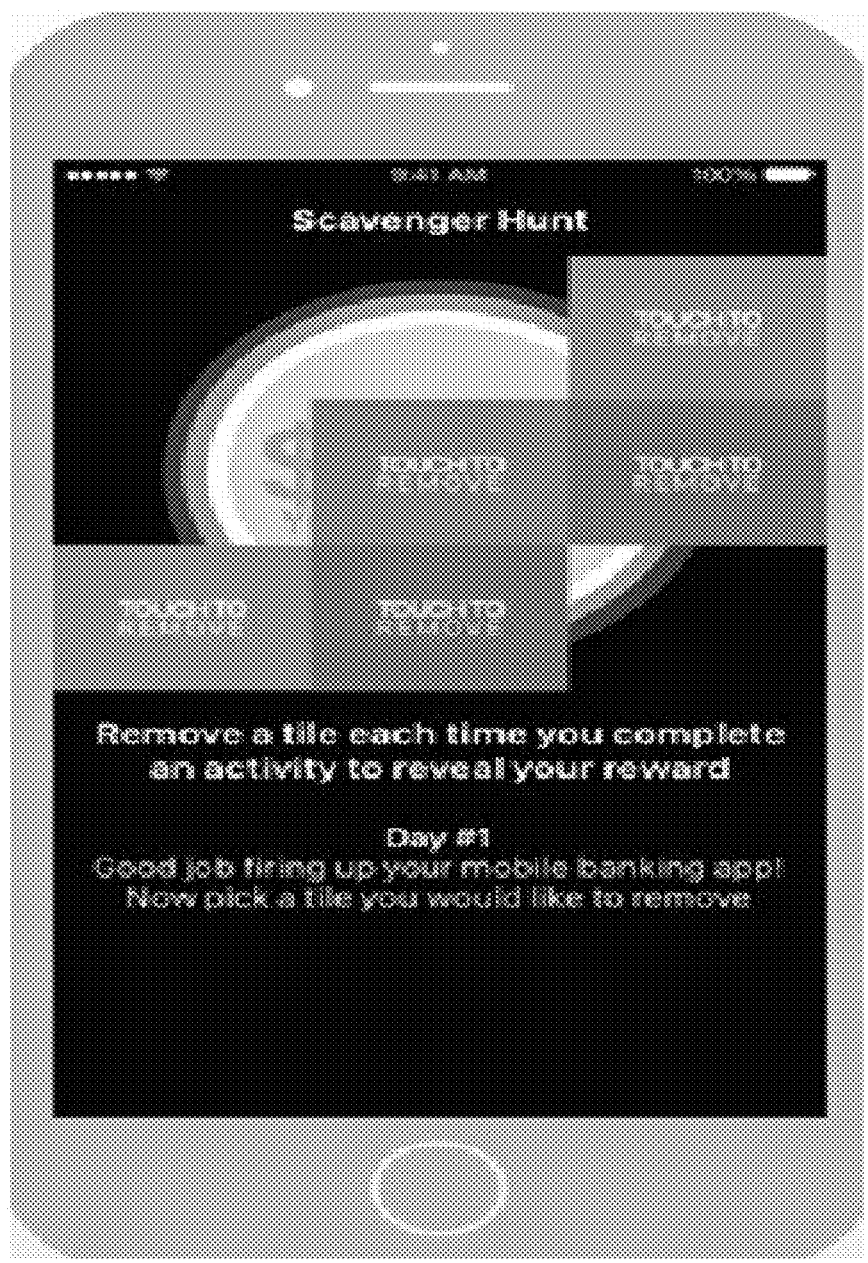
Figure 1F:
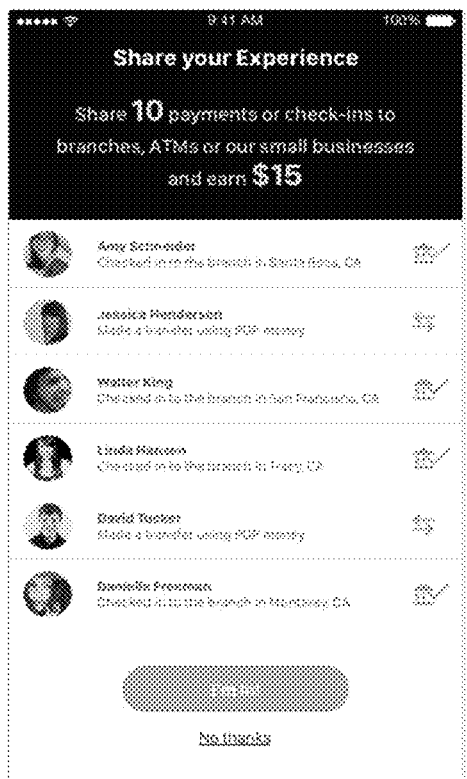
Figure 1G:
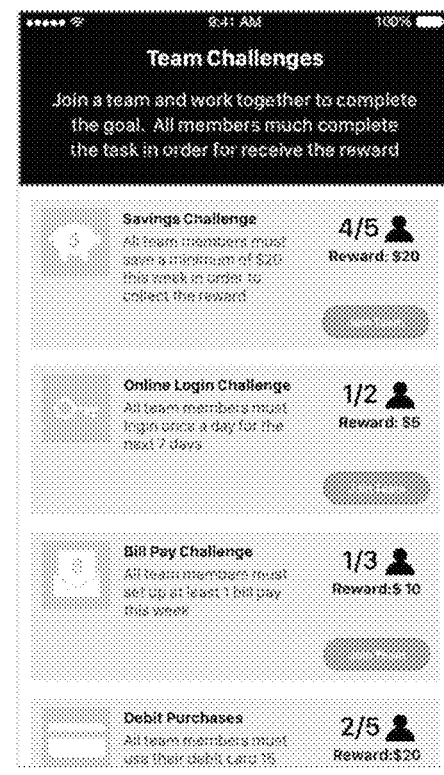
Figure 1H:
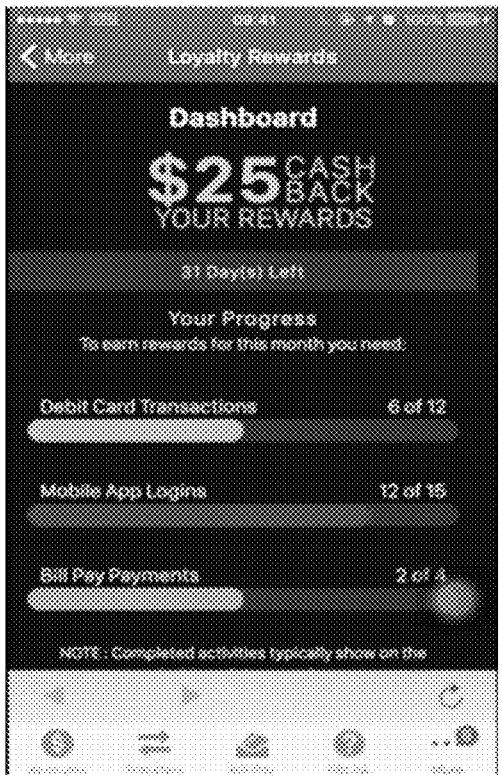
Figure 1I:
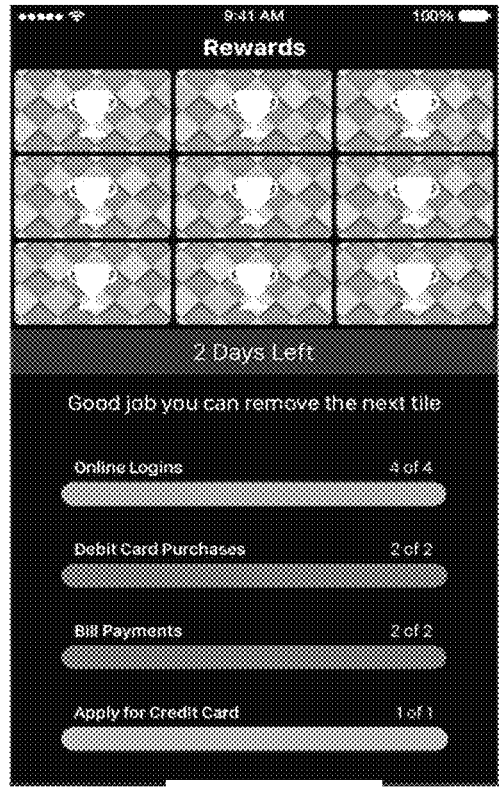
Figure 1J:
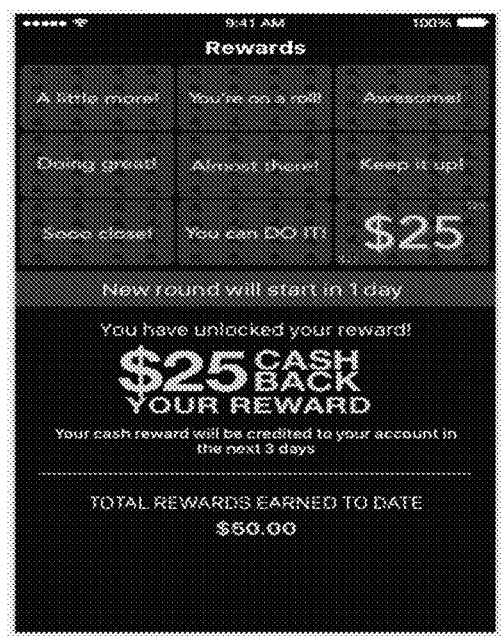
Figure 1K:
Figure 1L:
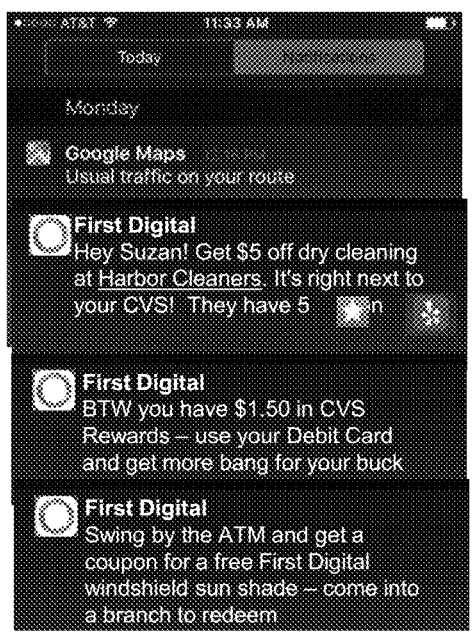
Figure 1M:
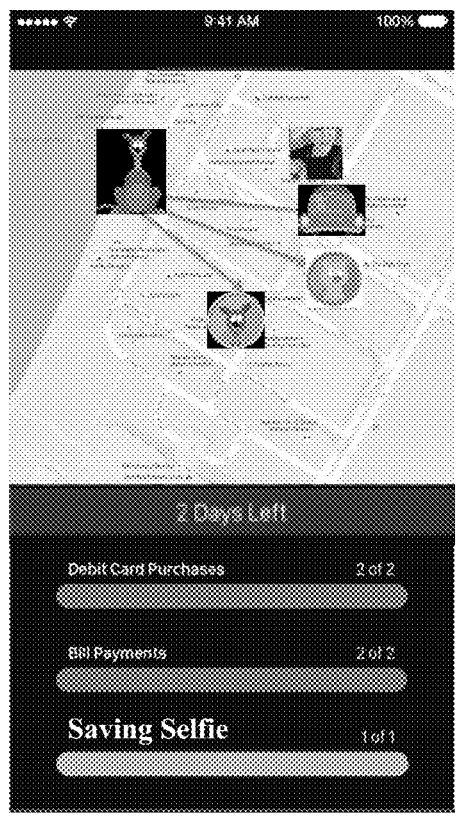
Figures 1N, 1O:
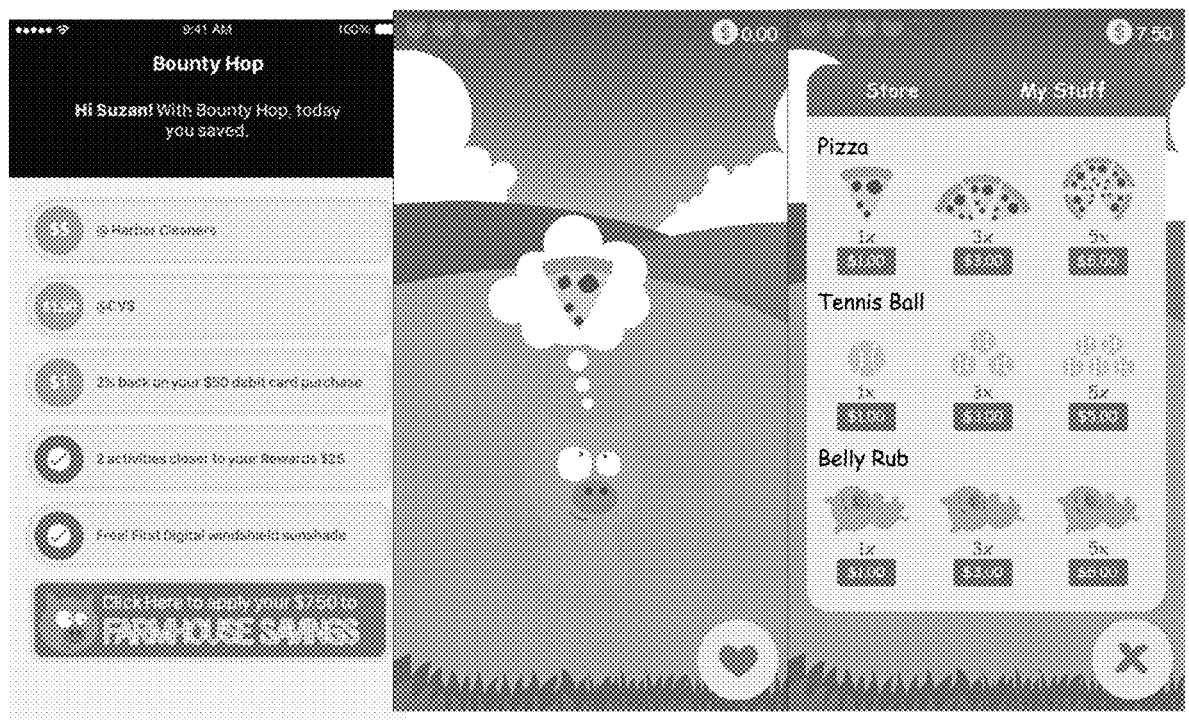

The FIGS. 1(B)-(O) are screenshots rendered on a display of a user-operated device for action inducement processing by the system of the FIG. 1A, according to an example embodiment.

These screenshots can be rendered through the mobile application discussed above in the FIG. 1A processing on the user-operated device 120 through settings and configurations provided by the personalization manager 170, which is driven by the blended reality manager 160. The blended reality manager 160 driven by loyalty systems 150, transaction processing systems 130, and the channel tracking manager 140.

The screenshot in the FIG. 1(B) illustrates 4 activities of a user that are needed for a user to earn a $25 cash back award with a bank. The first activity is online logins to the bank (a virtual activity) for which 8 logins for a month are required. The second activity is debit card purchases made by the user for the month (can be online (virtual) or in person at a POS terminal 110) for which 10 purchase activities are need for the month. The third activity is for online bill payments (virtual activity) for which 3 online bill pay transactions are needed for the month. The fourth activity is for the user to apply for a credit card with the bank (can be in person (real world) or online (virtual)). A status indicator provides a status that the user is currently at in reaching the four sub goals (each sub goal being a predefined number of activities of a particular type (four times illustrated)). It is noted that even if the user did not previously engage in the mobile-application initiated game (reaching completing of the sub goals), the mobile application can present the screenshot and ask the user if they are interested in playing the game.

The FIG. 1(C) presents another screenshot for a type of game in which as the user completes sub goals of the game, a tile can be removed and once the tile is exposed the user enjoys the cash back award displayed under hidden under the middle and center tile. In this game, tiles are removed as the user completes a campaign based activity.

FIG. 1(D) presents a screenshot for a random chance game, in which the user moves their finger over a displayed covered region to interactively reveal a reward ($10 cash back in this example). This is a game of chance that can be provided based on pre-defined banking activities performed by the user. In an embodiment, the more activities performed increases the chance that the reward is present or that the reward is better.

FIG. 1(E) presents two separate screenshots that illustrate an interactive social media game in which the user compete against one another to increase their reward multiplies. The screenshot on the right of the FIG. 1E indicates that the user (labeled as "you") challenges John (another user) to a savings competition for a configured period of time. The screenshot on the left of the FIG. 1E indicates that there are 7 days left in the game.

FIG. 1(F) presents a screenshot for social-media based game in which the user receives $15 cash back for sharing online payments or physical bank check-ins on the social media account of the user.

FIG. 1(G) presents a screenshot for a team-based social media game, in which groups of users compete for reward amounts. Each team can have different goals that each member of the team has to achieve to receive the team award amount.

FIG. 1(H) presents a screenshot showing a different presentation for an individual based set of activities to obtain a $25 cash back award, which is slightly different from the FIG. 1(B).

Similarly, the FIG. I(I) presents a screenshot that combines features of the FIGS. 1(B)-1(D) into an individual-based game.

FIG. 1(J) presents a screenshot where the game includes labels over the tiles of the game and each square may or may not include a reward (as shown in the scenario presented in the screenshot in the FIG. 1(K).

FIG. 1(L) presents a screenshot depicting the example provided above with respect to providing the sub promotions for a journey that the user is known to engage in as notifications presented within the mobile application (dry cleaner, pharmacy, ATM, bank example).

FIG. 1(M) presents a screenshot depicting how activating a sub promotion or selection of the notifications presented in the FIG. 1(L) can activate an interactive and animated navigation map as discussed with the example above.

FIGS. 1(N) and 1(O) present screenshots from the Bounty Hop game discussed in the above examples.

The system 100 integrates real-world promotions into the real-world and virtual world (online) activities and journeys of users to entice the user to remain engaged and achieve sub goals (through activities) to reach a larger game goal that provides a real world reward to the user. Behaviorally, the user becomes active and engaged is likely to spend more time on the mobile application and engaged with an enterprise creating advertising, loyalty, and unique opportunities for the enterprise to induce user actions (activities) and utilize the enterprise's services more frequently and on an on-going and continual bases.

As used herein the terms "user," "consumer," and "customer" may be used interchangeably and synonymously with one another.

In an embodiment, the POS terminal 110 is a Self-Service Terminal (SST). In an embodiment, the SST is an ATM. In an embodiment, the SST is a kiosk.

In an embodiment, the user-operated device 120 is a mobile device. In an embodiment, the mobile device is one of: a tablet, a laptop, a wearable processing device, a phone, and an intelligent appliance part of the Internet-of-Things (IoTs).

In an embodiment, the transaction processing systems 130 can include POS-based interfaces for POS-initiated transactions by the user or web-based/mobile application-based initiated transactions with a retailer/financial institution.

As used herein an "activity" includes a physical action taken by the user in the real-world (such as visiting a specific geographical location, visiting a specific retailer, visiting a specific type of retailer, and the like) or virtual actions taken by the user through online activity (such as performing some online action or set of actions, performing an operation, and the like).

These embodiments and other embodiments are now discussed with reference to the FIGS. 2-4.

Figure 2:
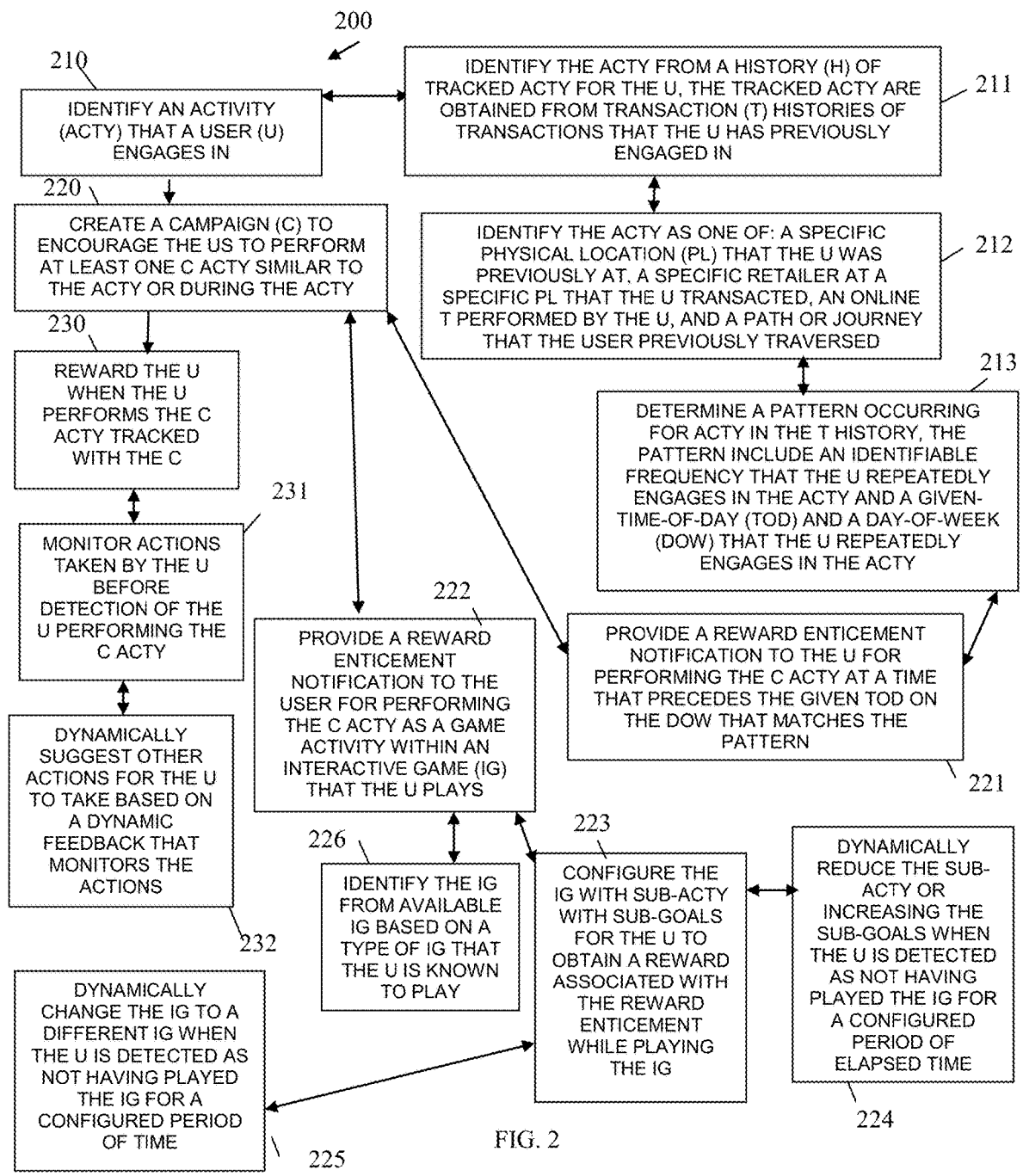
FIG. 2 is a diagram of a method for action inducement processing, according to an example embodiment.

FIG. 2 is a diagram of a method 200 for action inducement processing, according to an example embodiment. The software module(s) that implements the method 200 is referred to as a "user-activity inducement manager". The user-activity inducement manager is implemented as executable instructions programmed and residing within memory and/or a non-transitory computer-readable (processor-readable) storage medium and executed by one or more hardware processors of a hardware computing device. The processors of the device that executes the user-activity inducement manager are specifically configured and programmed to process the user-activity inducement manager. The user-activity inducement manager has access to one or more networks during its processing. The networks can be wired, wireless, or a combination of wired and wireless.

In an embodiment, the device that executes the user-activity inducement manager is a hardware server. In an embodiment, the hardware server executes a backend financial system that manages a financial account of a consumer.

In an embodiment, the device that executes the user-activity inducement manager is a collection of servers organized as a cloud processing environment.

In an embodiment, the user-activity inducement manager is some combination of or all of the processing discussed above for the components 140, 150, 160, 170, and/or 180.

At 210, the user-activity inducement manager identifies an activity that a user is engaged in. The activity can be a purchase transaction for a good or service in the real world at a POS terminal 110; the purchase can be online (virtual) through a transaction system 130; or, the activity can be visiting a physical location, visiting a website (virtual), or performing an operation or action online (virtual).

According to an embodiment, at 211, the user-activity inducement manager identifies the activity from a history of tracked activity for the user. The tracked activity is obtained from the transaction histories of transactions that the user has previously engaged in. In an embodiment, the history also includes other transaction histories for other users engaged in other transactions that are not directly associated with and are different from the user and the user's transaction.

In an embodiment of 211, and at 212, the user-activity inducement manager identifies the activity as one of: a specific physical location that the user was previously known to be at, a specific retailer at a specific location that the user previously transacted, an online transaction performed by the user, a path or journey that the user previously traversed (such as the example above with the FIGS. 1(A)-1(O) that included the dry cleaner, the pharmacy, the ATM, and the bank branch—journey).

In an embodiment of 212 and at 213, the user-activity inducement manager determines a pattern occurring for activities in the transaction history. The pattern includes an identifiable frequency that the user repeatedly engaged in the activity and a given day-of-the week (DOW) and time-of-day (TOD) that the user repeatedly engaged in the activity. In an embodiment, the transaction history is for a segmentation of multiple users and their transaction histories for determining the pattern.

At 220, the user-activity inducement manager creates a campaign to encourage the user to perform at least one campaign-directed activity that is similar to the activity or that the user can perform during the activity ("similar" can mean a same type of retailer, same type of good or service, or available along a path or during a known journey that the user traverses in performing the activity).

In an embodiment of 220 and 213, at 221, the user-activity inducement manager provides a reward enticement notification for a reward (promotion, gift, or discount) to the user for the user to perform the campaign-directed activity. The reward enticement notification is sent to the user at a time that precedes (by a configured amount) the TOD and DOW. The reward enticement notification can also be sent based on a known physical location of the user during the TOD and DOW that matches the pattern.

In an embodiment, at 222, the user-activity inducement manager provides the reward enticement notification to the user for performing the campaign-directed activity as a game activity within an interactive game that the user plays, such as any of the games described above in the FIGS. 1(B)-1(O). In an embodiment, the game is a scavenger hunt.

In an embodiment of 222, and at 223, the user-activity inducement manager configures the interactive game with sub-activities having sub-goals for the user to obtain a reward (promotion, discount, gift) associated with the reward enticement notification while playing the interactive game. This was also described with the example situations above with the FIGS. 1(B)-1(O).

In an embodiment of 223, and at 224, the user-activity inducement manager dynamically reduces the sub-activities or increases the sub-goals when the user is detected as not having played the interactive game for a configured period of elapsed time. This is a situation where the engagement of the user is detected as waning and so the game is dynamically adjusted to entice the user to begin playing the game again.

In an embodiment of 223, and at 225, the user-activity inducement manager dynamically changes the interactive game to a different interactive game or a different challenge level from a challenge level associated with the interactive game when the user is detected as not having played the interactive game for a configured period of elapsed time. Here, the type of game can be switched altogether. That is, the user may be more interested in social-media based games than the original game presented as a game of chance.

In an embodiment of 222, and at 226, the user-activity inducement manager identifies the interactive game from a list of available games based on a type of interactive game that the user is known to play or a particular interactive game that is similar to known behaviors associated with the user (such as frequent posting to social media accounts indicating a behavior where a particular interactive game that is social media based may induce the user to engage). Here, if a transaction history of the user indicates that the user enjoys the game of Candy Crush®, then a game similar to this game can be provided as the interactive game.

At 230, the user-activity inducement manager rewards the user when the user performs the campaign-directed activity that is being tracked and linked to the campaign.

In an embodiment, at 231, the user-activity inducement manager monitors actions taken by the user before detection of the user having performed the campaign-directed activity. That is, the journeys, transactions (real world and virtual) can be noted during the period of game play to learn more about the behavioral actions of the user on a day-to-day basis.

In an embodiment of 231, and at 232, the user-activity inducement manager dynamically suggests other actions for the user to take during the game play based on a dynamic feedback loop that monitors the actions. That is, the user-activity inducement manager begins to learn specific routines and patterns taking by the user during a given time period and with respect to transactions and locations visited by the user (both real world and virtual).

In an embodiment, the user-activity inducement manager obfuscates or hides the reward from the user under a single displayed tile presented with a plurality of selectable tiles on a display of the user-operated device. As the user, performs induced actions, the user is permitted to select a tile (through an input mechanism, such as touch or click) and reveal a corresponding reward or potential for a reward.

In an embodiment, the user-activity inducement manager presents discovery of the reward to be achieved through display of a plurality of virtual concentric segments around a center of reward coordinates (presented on a display of the user-operated device). The user-activity inducement manager allows the user to click on displayed times only when a configurable percentage of overlay area between the tiles and segments is reached. Eligibility of tiles to be clicked are given to tiles that are farthest from the reward coordinates.

Figure 3:
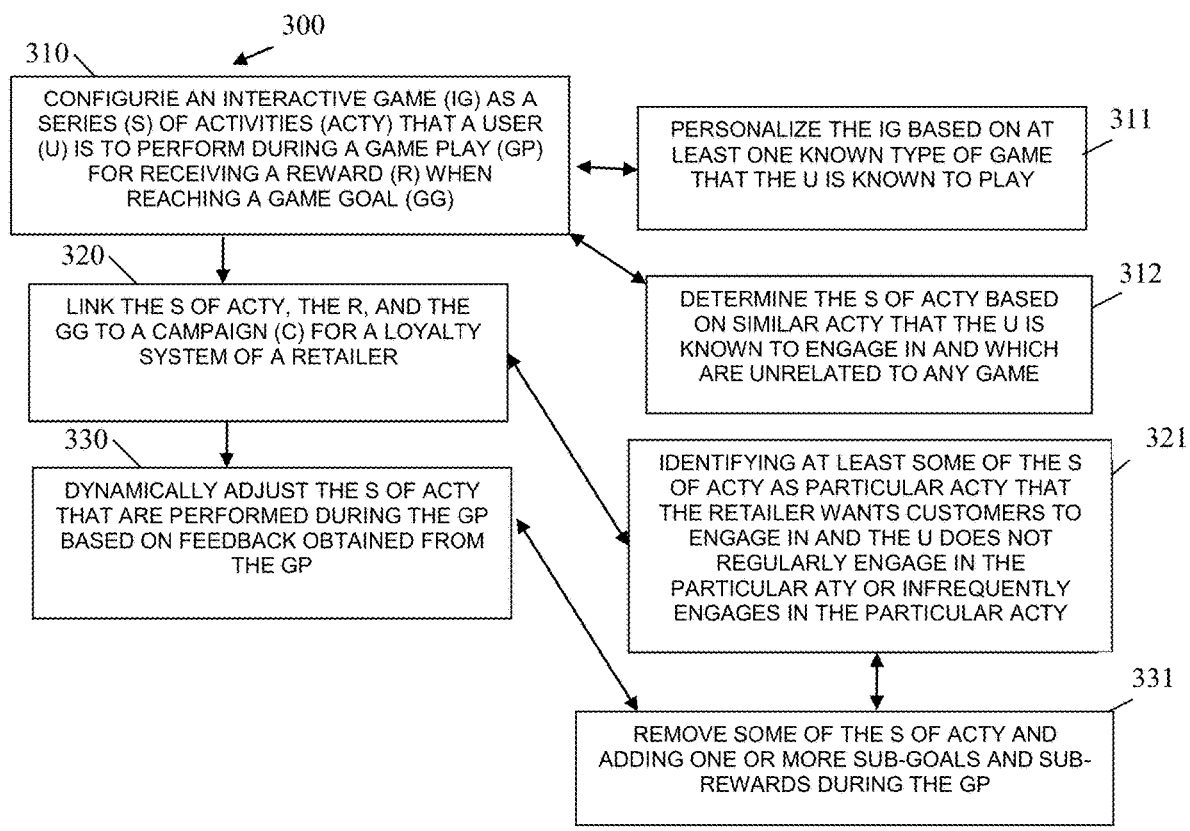
FIG. 3 is a diagram of another method for action inducement processing, according to an example embodiment.

FIG. 3 is a diagram of another method 300 for action inducement processing, according to an example embodiment. The software module(s) that implements the method 300 is referred to as an "interactive user-activity engagement manager." The interactive user-activity engagement manager is implemented as executable instructions programmed and residing within memory and/or a non-transitory computer-readable (processor-readable) storage medium and executed by one or more hardware processors of a hardware device. The processors of the device that executes the interactive user-activity engagement manager are specifically configured and programmed to process the interactive user-activity engagement manager. The interactive user-activity engagement manager has access to one or more networks during its processing. The networks can be wired, wireless, or a combination of wired and wireless.

In an embodiment, the device that executes the interactive user-activity engagement manager is a hardware server. In an embodiment, the hardware service also executes a financial system, which manages a financial account of a consumer.

In an embodiment, the device that executes the interactive user-activity engagement manager is a collection of cooperating servers organized as a cloud processing environment.

In an embodiment, the interactive user-activity engagement manager is some combination of or all of the processing discussed above with the components 140, 150, 160, 170, 180, and/or the method 200.

The interactive user-activity engagement manager presents another perspective and in some cases an enhanced perspective of the method 200.

At 310, the interactive user-activity engagement manager configures an interactive game as a series of activities that a user is to perform during a game play for the user to receive a reward (promotion, gift, discount, even next level of game play, or an artifact during game play) when reaching a game goal.

According to an embodiment, at 311, the interactive user-activity engagement manager personalizes the interactive game based on at least one known type of game that the user is known to play. The personalization can also reflect the user's known habits (identified by transactions and locations visited (real world and virtual) of the user during specific times and days (time-based).

In an embodiment, at 312, the interactive user-activity engagement manager determines the series of activities based on similar activities that the user is known to engage in and which are unrelated to any game (such as the habits of the user discussed above at 311).

At 320, the interactive user-activity engagement manager links the series of activities, the reward, and the game goal to a campaign for one or more loyalty systems of one or more retailers.

In an embodiment, at 321, the interactive user-activity engagement manager identifies at least some of the series of activities as particular activities that the retailer wants customers to engage in and the user does not regularly engage in the particular activities or infrequently engages in the particular activity. For example, the particular activity of the retailer may be to get the user to perform more RDC transactions as opposed to the known habit of the user to do physical check deposit transactions.

At 330, the interactive user-activity engagement manager dynamically adjusts the series of activities that are to be performed by the user during the game play based on feedback obtained from the user's actual game play and the user's actual activities, which may be completely unrelated to the game play but detectable in the manners discussed above with the FIGS. 1(A)-1(O), such as through the components 130-180.

In an embodiment of 330 and 321, at 331, the interactive user-activity engagement manager removes some of the series of activities and/or adds one or more sub-goals and sub-rewards during the game play in response to the feedback. The interactive user-activity engagement manager learns what works and does not work with the user through tracking the user's real world travels and activities and tracking the user's virtual travels (websites visited online) and virtual activities (operations performed on computing devices or while at the websites).

Figure 4:
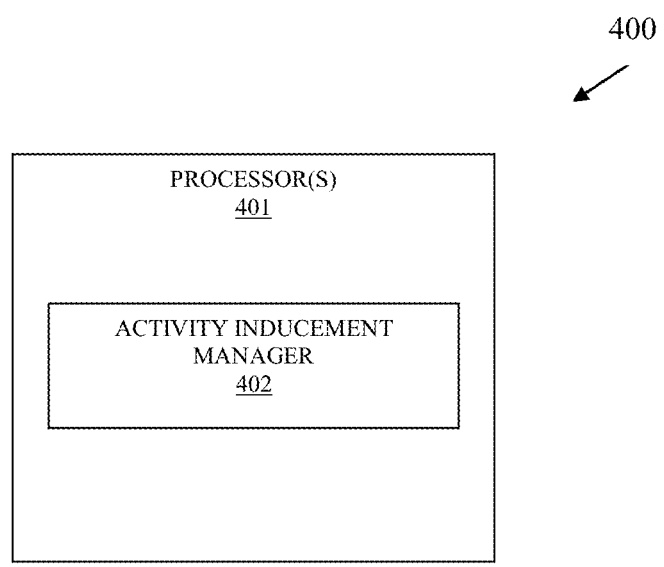
FIG. 4 is a diagram of an action inducement processing system, according to an example embodiment.

FIG. 4 is a diagram of an action inducement processing system 400, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements, inter alia, some combination of the processing discussed above with the FIGS. 1A-1B and 2-3.

The system 400 includes at least one hardware processor 401 and an activity inducement manager 402.

The activity inducement manager 402 is configured to: execute on the processor 401; derive an activity for a user to perform from a history of a activities that the user engages in and from a campaign; provide a reward notification to the user for obtaining a reward when the activity is performed by the user; and deliver the reward when the user is detected as performing the activity.

In an embodiment, the activity inducement manager 402 is further configured to: derive at least one second activity with at least one second reward for the user to perform that includes a particular activity from the history of activities that the user is known to regularly engage in or that other users similar to the user are known to regularly engage in. That is, the activities known for the user can be scored and matched with a type of user and a history for that type of user may include the derived second activity. The type or segmentation for a particular type of user can include a plurality of activities that are engaged in by multiple independent users.

In an embodiment, the activity inducement manager 402 is further configured to: provide the activity, the reward notification, and the reward as part of an interactive game that the user plays on a mobile device operated by the user.

In an embodiment, the activity inducement manager is some combination of or all of the processing discussed above at 140-180, the method 200, and/or the method 300.

It is now appreciated how habits of a user can be derived through tracking history of a user's real-world activity (journeys, locations visited, and transactions) and the user's virtual activity (websites visited, operations performed, applications accessed, etc.). The habits are identified from patterns that include frequencies of activities and the time dependencies of the activities. These habits can be mapped to campaign goal activities and rewards within a variety of interactive games that induce the user to perform the campaign activities and alter or change the user's habits or behaviors. The game blends virtual interaction (online interaction) of the user and real world interaction of the user to increase the interest and maintain the interest of the user. Additionally, the game can be dynamically altered based on detected changing habits of the user with respect to the real-world activity, the virtual activity, and the user's detected engagement in the game play of the game. This provides the retailer with a unique opportunity to integrate into and become a part of the user's experiences (real world and virtual), which provides increased marketing opportunities while also increasing the user's loyalty to the retailer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a hardware processor from a non-transitory computer-readable storage medium causing the hardware processor to perform operations comprising:
providing a user-operated device of a user with a mobile application;
identifying an activity that the user engages in by monitoring specific transactions of the user with transaction processing systems and by monitoring specific locations visited by the user that are reported by location services of the user-operated device operated by the user, wherein the transaction processing systems comprise Point-Of-Sale (POS) terminals, Self-Service Terminals (SSTs), web-based transaction systems, and mobile-application transaction systems, wherein identifying further comprises:
determining a pattern and a frequency with which the pattern recurs from the specific transactions and the specific locations associated with the activity;
identifying the activity from a history of tracked activities for the user, wherein the tracked activities are obtained from transaction histories of transactions that the user has previously engaged in, and wherein the history includes other tracked activities for other users having other transactions that are not directly associated with the user;
identifying the activity as one of: a specific physical location that the user was previously at, a specific retailer at a specific physical location that the user transacted, an online transaction performed by the user, and a path or journey that the user previously traversed; and
determining the pattern occurring for the activity in the transaction history, wherein the pattern includes at the frequency that the user repeatedly engages in the activity and a given time-of-day and a day-of-week that the user repeatedly engages in the activity;
creating a campaign based on the pattern and the frequency that encourages the user to perform at least one campaign activity as a game activity within an interactive game based on a reward being provided for the game activity, wherein the reward is associated with performance of the at least one campaign activity, wherein the at least one campaign activity is similar to the activity or during the activity and interacting with an interface of the mobile application during the campaign to encourage the at least one campaign activity, wherein creating further comprises:
sending a reward enticement notification to the interface of the mobile application when a current physical location of the user-operated device matches a known physical location in the pattern;

providing the reward enticement notification to the user for performing the at least one campaign activity at a time that precedes the given time-of-day on the day-of-week that matches the pattern;

configuring the interactive game with sub-activities with sub-goals for the user to obtain the reward associated with other rewards enticements while playing the interactive game; and dynamically reducing the sub-activities or increasing the sub-goals when the user is detected as not having played the interactive game for a configured period of elapsed time;

rewarding the user when the user performs the at least one campaign activity tracked with the campaign by permitting selection of a specific reward within the interface that is presented on a display of the user-operated device, wherein the specific reward selected by the user from available rewards associated with the interactive game and the available rewards comprise the reward and other rewards associated with performance of the at least one campaign activity, wherein rewarding further comprises:

monitoring both real-world actions taken by the user and virtual actions taken by the user with respect to the mobile application before detection of the user performing the at least one campaign activity, wherein at least one real-world action comprises the user traveling to a specific geographical location, and wherein at least one virtual action comprises the user performing an operation with the mobile application, wherein the interactive game is a social media game; and dynamically suggesting other actions for the user to take based on a dynamic feedback that monitors the real-world actions and the virtual actions.

2. The method of claim 1, wherein configuring further includes dynamically changing the interactive game to a different interactive game or a different challenge level from a challenge level associated with the interactive game when the user is detected as not having played the interactive game for a second configured period of elapsed time.

3. The method of claim 1, wherein providing further includes identifying the interactive game from available interactive games based on one of: a type of interactive game that the user is known to play and a particular interactive game that is similar to known behaviors associated with the user.

4. The method of claim 1, wherein rewarding further includes monitoring actions taken by the user before detection of the user performing the at least one campaign activity.

* * * * *